United States Patent
Benado

(10) Patent No.: US 6,638,560 B2
(45) Date of Patent: *Oct. 28, 2003

(54) PROCESS FOR EXTRACTING AND DESOLVENTIZING NATURAL OIL-CONTAINING FOOD PRODUCTS WITH MINIMUM STRUCTURAL DAMAGE

(76) Inventor: Adam L. Benado, P.O. Box 1055, Freeport, TX (US) 77541

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 18 days.

(21) Appl. No.: 09/064,503

(22) Filed: Apr. 23, 1998

(65) Prior Publication Data

US 2002/0012740 A1 Jan. 31, 2002

Related U.S. Application Data

(62) Division of application No. 08/669,247, filed on Jun. 24, 1996, now Pat. No. 5,783,243.

(51) Int. Cl.$^7$ .............................. A23L 1/36; A23L 1/28
(52) U.S. Cl. .................... 426/632; 426/486; 426/489; 426/429; 426/430
(58) Field of Search ................................ 426/632, 486, 426/489, 425, 429, 442; 554/430, 9; 422/281, 289, 277, 278; 34/330, 338, 373, 480

(56) References Cited

U.S. PATENT DOCUMENTS

| | | | | |
|---|---|---|---|---|
| 2,932,559 A | * | 4/1960 | Plauk | 23/310 |
| 4,635,380 A | * | 1/1987 | Anderson | 34/27 |
| 5,290,578 A | * | 3/1994 | Passey et al. | 426/417 |
| 5,516,923 A | * | 5/1996 | Hebert et al. | 554/12 |
| 5,783,243 A | * | 7/1998 | Benado | 426/425 |

* cited by examiner

Primary Examiner—Anthony J. Weier
(74) Attorney, Agent, or Firm—William J. Daniel

(57) ABSTRACT

The present invention is an improvement in a method of desolventizing a marc resulting from the extraction of a mass of an oil-containing material with a normally gaseous hydrocarbon solvent for the oil therein after completion of the extraction, the solvent is drained from the marc, leaving residual solvent retained in the marc, and gaseous vapors heated above the solvent boiling point are passed through the zone in contact with said marc to volatilize the residual solvent therein. The improvement involves establishing within the extraction zone a desolventizing region defined between an inlet port and an exit port for the heated vapors and progressively displacing the desolventizing region from adjacent one zone end to adjacent its opposite end, whereby only a fraction of the marc within said closed zone is contacted with the flow of heated gaseous vapors at any given time.

11 Claims, 2 Drawing Sheets

Figure 1A:
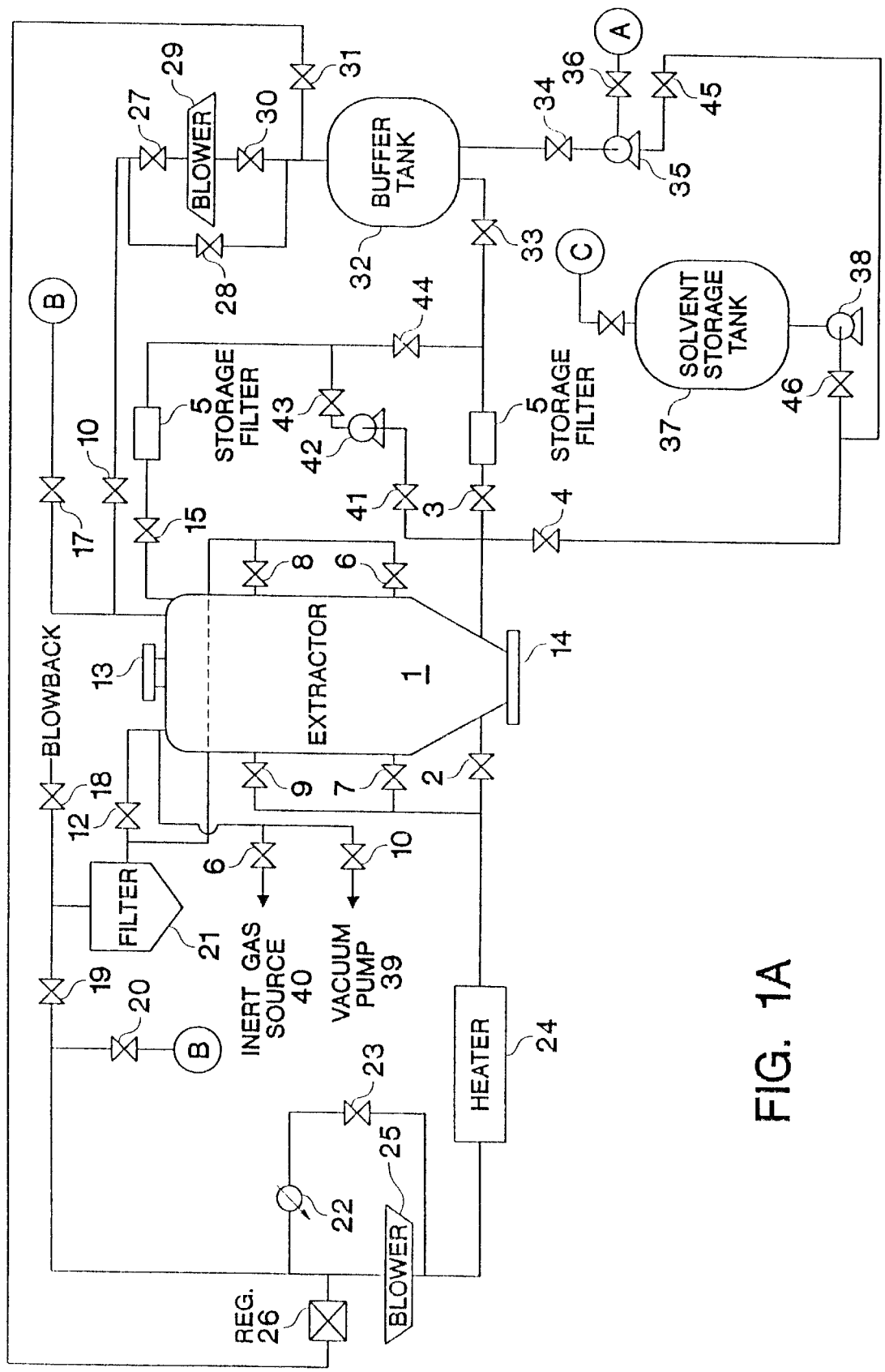

PROCESS FOR EXTRACTING AND DESOLVENTIZING NATURAL OIL-CONTAINING FOOD PRODUCTS WITH MINIMUM STRUCTURAL DAMAGE

This application is a division of application Ser No. 08/669,247, filed Jun. 24, 1996 now U.S. Pat. No. 5,783,243.

INTRODUCTION

The separation of fats and oils from oil-containing natural edible raw materials of various types and the use of the extracted fat and defatted residue as food ingredients is a time-honored practice in food preparation. Olive oil, produced by pressing olives at certain ripeness, dates back at least as far as written history, and in several parts of the world continues to this day to be produced in the time-honored manner. Over the course of human history, many other sources of oil were discovered and developed, including sunflower, safflower, sesame, nutmeat and grape seeds.

Throughout history, oil has been a valued adjunct in cooking by virtue of its ability to impart flavor and mouth-feel to food, promote evenness of cooking, and retard food degradation over time. Fats and oils have also been prized for nutritional reasons because they contain more than double the energy content, i. e. about 9 Kcal/gm, of carbohydrates and proteins. Also, many fats and oils contain essential fatty acids which the human body cannot endogenously produce and yet needs for proper function.

Nutritional trends over the past several decades in the United States other industrially developed countries indicate that for the most part, inadequate caloric intake is no longer a nutritional problem. Indeed, the very reverse appears to be true in that for the United States in particular, a startling increase in obesity has been observed over the last two decades. This trend has aroused concern among public health officials and has led to the creation of a large and rapidly growing diet food industry, increasingly restrictive changes in food labeling regulations, and major changes in dietary recommendations by food authorities.

Past innovators in the area of extracting fats and oil from seeds (including nut kernels or meats) have concentrated on maximizing the amount of high-quality, fat recovered without regard to damage done to the structure of the seed matrix, which was often deliberately sacrificed in order to increase efficiency and because maintaining structural integrity of the residual matrix has relatively little importance, such residual matrix being used principally as cattle feed. Thus, the seeds or meats were comminuted or even finely ground to facilitate a rapid and high yield extraction so that the sub-divided residue completely lost its natural coherent structure. Consequently, the only nutmeats available in reduced fat form were comminuted or ground.

Due at least to an important extent to the convergence of the latter practice with the above trends, seeds in nut or shelled form, e.g. peanuts, tree-nuts and the like, have suffered a definite decrease in consumption in the United States. It is a reasonable conclusion that more peanuts, cashews, and other nut products would be consumed if high quality, reduced-fat versions of the same were available. Obviously, the ideal nut snack or candy additive for many people would have the same texture, flavor, and appearance of a normal full-fat nut, but with appreciably less fat.

This invention relates to a process for extracting by means of propane, butane, and/or isobutane as solvent large amounts of fat from edible products which either retain their natural structure in entirety or have been relatively lightly sub-divided into marketable granules of fairly large physical dimension which are characterized by a substantially intact cellular structure. The present process has produced, among other products, partially defatted whole peanuts, partially defatted whole cashews (and other nuts), and partially or wholly defatted nutmeat granules and pieces. By leaving the cellular structure essentially intact after extraction, i.e. by neither finely (comminuting nor reconstructing a finely divided form into a granular product, the texture and appearance of the starting raw material can be preserved but with a reduced fat content.

The primary concern of the present invention is to produce from oil- or fat-containing edible raw material, without the use of any toxic substances, partially and/or fully defatted nut products which are substantially similar in shape and structure to the starting raw material, and have acceptable texture and flavor as compared with the raw material, yet with significantly less fat or oil content.

Historically, methods for recovering vegetable fat and oil can be separated into three general time periods:

(a) Pressing with a fixed mechanical or hydraulic press was the predominant approach from the earliest days to the latter part of the 19th century, and is still in limited use today for the production of some very high value oils. This technique was restricted to batch operation and was never suitable for large-scale production. Moreover, oil yields are limited by the achievable pressure, and residual oil levels in press-cake are often in the neighborhood of 20% or even more, though lower values are sometimes possible. The raw material is usually, but not always, broken up into fine meal under the pressures generated in the press. When not broken up into fine meal, the pressing operation results in a grossly distorted flattened product which, even after puffing or re-expansion, still shows evidence of folds or creases on the surfaces resulting from the pressing operation.

(b) Expelling, e.g. with a continuously operating screw or the like, was initially developed late in the last century and grew into a major form of processing in the first half of the current one. It continues to be used extensively around the world today and improvements to the technology continue to be made. It lends itself very well to large economies of scale and continuous production, resulting in low unit costs. Often the raw material is toasted prior to or during the expelling process in order to coagulate proteins and better release the oil therefrom. The raw material is invariably ground into meal by the process. Residual oil contents are lower than for pressing, often reaching as little as about 10%.

(c) Solvent extraction of oil was originally developed in Germany between the two world wars in order to maximize the yield of oil removed from an oleaginous material. In this process a product which may have been already partially de-oiled by expelling is often used as raw material. In that case, the product is substantially comminuted. If not comminuted as a consequence of a prior partially defatting treatment, the raw material is comminuted before direct extraction is carried out. Usually, the raw material is flaked or ground and pelletized (to minimize fines) and is then contacted with a solvent which is most frequently hexane. The solvent dissolves more than 90% of the fat present in a matter of a few minutes. The solvent is then separated from extracted oil by desolventization (usually by means of heat), while the totally defatted meal is delivered into a desolventizer/toaster where it is subjected to a heat treatment to boil away remaining solvent. Processes of this type are used extensively throughout the world. They yield oil of edible quality and meal useful as animal feed, both products playing critical roles in the world food supply.

Some fatty commodities are processed in very unique ways, as, for example, cocoa, which is often converted first into chocolate liquor, part of which is subsequently pressed for separation into cocoa butter and cocoa powder.

Historically, virtually all processes for recovering vegetable fat and oil have begun with raw material which is either fully comminuted in advance of processing or undergoes comminution during the extraction process itself. The historical reason for this is twofold. First, research experience has confirmed ordinary common sense that penetration of a normally liquid solvent into a non-comminuted raw material is at best difficult to achieve. One report of such experience may be found in Othmer et al. Chem. Eng. Prog. 51:372 (1955), but many other like articles are in the technical literature.

One problem is that nutmeats like all living matter have a cellular structure where cells are separated by walls or membranes which resist solvent action. In the first place, the integrity of the wall itself resists solvent penetration. Secondly, even if a wall is ruptured, migration of solvent into, and of the oil-loaded solvent out of, a consecutive series of cells (which may run into the thousands) necessarily depends upon a slow diffusional process. When an oil-containing body such as a whole peanut is contacted with a solvent such as hexane, the first oil, present in the outer layers of cells, is reached relatively quickly by the solvent but there is nothing to force the solvent through intact cell walls into the interior to extract the oil from interior cells. The historical experience has therefore green that solvent extraction on non-comminuted large, and particularly whole, pieces of nut material has resulted in abysmally low oil yields, and those trained in the art have concluded that only surface oil can be extracted therefrom. A second problem encountered early on in the extraction of oil from natural materials is the extreme difficulty in removing residual normally liquid solvent from the processed material. Hexane, which is almost universally used as a solvent for oil, is a known mutagen and causative agent for kidney problems and central nervous system disorders. It is also a suspected carcinogen. Its use is subject to severe legal restrictions which require that the desolventized edible products be completely free of solvent residue. While this is fairly straightforward to do from the oil and from completely comminuted fine meal, it is virtually impossible to achieve from defatted nut meats of intact cell structure. The use of hexane, and most other conventional solvents, is therefore rendered impractical for products of defined natural shape and cell structure.

Historically, the solution to these problems has been fairly simple and focused on raw material preparation. Countless proposals have been made over the past five decades for comminuting, toasting, drying, flaking, milling and pelletizing and so on to prepare the raw material for extraction and desolventization. Soybeans and peanuts, for example, are most commonly flaked or sometimes ground and pelletized, and modern mills use mixtures of flakes (which are the easiest to desolventize) with pellets (which keep the extraction beds fluffy and allow for easy solvent percolation and drainage). The purpose for preparation of the raw material for extraction by comminution by grinding, shearing and the like is clearly to reduce the effective particle size (i.e. minimum dimension) to dimensions allowing easy penetration of solvent. The minimum dimension required for this has almost invariably been on the order of thousandths of an inch or less. Even when the preparation process resulted in pellets as large as ¼ or ⅜ inch diameter and an inch in length, these pellets were made up of very fine particles whose minimum dimension is on the order of microns. In all cases, from flaking to pre-pressing to grinding, the minimum particle dimension described in the prior art is on the order of a few cell diameters or less.

One important aspect of this invention differentiating it from the prior art is its applicability to particles which remain in their natural basic structural state, so that even if chopped to a desirable market granulation, the minimum particle dimension in terms of intact cell diameters is orders of magnitude higher than is the case in the prior art. With a typical cell diameter of around 10 microns, and arbitrarily taking as a minimum particles of, say, 50 cell diameters, then 500 microns particle minimum dimension is the lower limit of the application of the present invention could conceivably begin, broadly speaking, at about 0.5 mm or ¹⁄₅₀ inch minimum particle dimension. But in practical terms and for sake of simplification, the invention is deemed applicable to granular material of the type under discussion having a minimum dimension of ¹⁄₃₂ inch, and more typically a minimum dimension of about ¹⁄₁₆ inch, within which the location of one cell relative to other cells in the matrix does not vary from their natural state.

The use of propane, butane, and isobutane (for convenience "PBI"), as solvents for oil in extraction processes where the raw material is converted to finely divided form can be found in many disclosures, starting with Rosenthal U.S. Pat. No. 2,254,245 and Reid U.S. Pat. No. 1,802,533 followed by Leaders U.S. Pat. No. 2,548,434, and continuing up to the present as evidenced by Heidias U.S. Pat. No. 5,405,633, Franke U.S. Pat. No. 5,281,732 and Zosel U.S. Pat. No. 4,331,695. The inventions in the prior art have all focused on the use of propane, butane, and isobutane for extracting oils from seeds such as soybeans, cottonseed, sunflower seed, and the like in comminuted systems, referred to as either "rolled", "cake", or "flaked". Indeed, Miller U.S. Pat. No. 2,687,551 reveals a method of gaining access to oil by using the force of the PBI solvent itself in a gun to destroy the cell structure, in addition to its well-known solvent action for the oil to be extracted. In cases where comminution was not carried out as a previous step in the process, the product undergoing extraction was naturally involved particulate matter of very small dimension. For example, rice bran is a by-product of rice milling and naturally comes off the milling machine with average particle size on the order of 80–100 mesh.

Following the logic outlined above regarding nutritional trends, considerable effort has been expended on methods for preparing low-fat nut derivatives. Vix et al U.S. Pat. No. 3,294,549 described a method for reducing the fat of nutmeats by a process of hydraulic pressing. Various improvements to the process have since been made, for example by Holloway U.S. Pat. No. 4,329,375 and subsequently by Wong et al. U.S. Pat. No. 5,164,217, principally for the purpose of improving the visual quality of the nut granules by reducing the amount of cracked material as well as the proportion of severely distorted nut granules. Subjecting a nut to pressures high as 7,000 psi in a hydraulic cage causes it to become substantially flat, and the latter patents cited above offer various creative ways for inducing the flattened nut to re-expand, preferably to a more or less oval shape which bears some resemblance to the starting nut. However, in industrial (and even laboratory) practice, it is virtually impossible to cause a mass of nuts to re-expand to their original shape. In particular, I have taken magnified photographs of the surface of commercially available nuts; partially defatted by means of mechanical pressure and then subjected to some expansion treatment reveals unevenness at the surface and often wrinkles as well. This distortion in appearance undoubtedly explains why nuts marketed after defatting in this manner have been "honey-roasted" which leaves on the nuts a coating that hide the deformation and distortion in their appearance.

Other improvements made in the pressing-type operations (for example, Holloway et al. U.S. Pat. No. 4,329,375, Wilkins et al. U.S. Pat. No. 4,466,987, Gannis et al. U.S. Pat. Nos. 4,938,987 and 5,002,802, and Zook et al, U.S. Pat. Nos. 5,094,874 and 5,240,726) have mainly centered on methods of infusing flavors into and improving texture of the partially defatted products produced by pressing.

In addition to their unnatural appearance, the products resulting from a pressing process are chemically dissimilar from the corresponding components of the original nuts as well. Pressing operations on peanuts, for example, remove unsaturated fat preferentially from the nut-meat. Thus, analysis of the oil remaining within the nutmeat after defatting by means of pressure gives a fatty acid profile higher in saturated fatty acids than the original oil present therein, while the oil extracted during the pressing operation contains relatively slightly less saturated fat. The amount by which saturated fat remains preferentially in the partially defatted nutmeats is significant enough to deter manufacturers from making certain saturated fat-related health claims, e.g. "low in saturated fat", for the processed nutmeats under current food labeling regulations.

Recently, Passey et al. U.S. Pat. No. 5,290,578 described a process for making reduced fat peanuts using carbon dioxide under supercritical conditions. In their invention, there was apparently some solvent penetration through cell walls into the interior of the peanuts. The pressures specified here were between 27 Mpa and 41 Mpa, or approximately 4,000 psi to 6,000 psi. Analysis of the data presented shows that even under such tremendous pressures (disregarding the practical difficulty in achieving such pressures on an industrial scale which would require an extraction vessel with steel walls more than 12 inches thick), and after 12 hours of extraction, and at solvent-to-feed ratios of at least 15 pounds of carbon dioxide per lb peanuts, in the best experiment reported, about 32% of oil present was recovered from the extractor (i.e., on a volumetric basis, e.g. lbs/cu. ft.). Assuming a 50% fat content in the incoming peanuts, this means that the finished peanuts, in the best of experiments reported, contained about 42% fat, giving less than a 20% by weight reduction. Nor is there any disclosure or evidence to suggest that a peanut with a lower fat content than that could be achieved.

Moreover, a fairly complicated multi-step pre-treatment involving humidification and microwaving was used for the best extraction results and to avoid breakage. In fact, for best results it was necessary for the nuts to be first humidified, then microwaved, then re-humidified, then re-microwaved, and finally re-humidified for a third time. One trained in the art of desiccation would conclude that the intent of this sequence was to essentially destroy the cell structure of the nuts prior to the CO2 extraction. Such combinations of humidification and desiccation are well known to cause an opening of cell structure by denaturation of proteins and retrogradation of starch, particularly when carried out at the reported high temperatures (158 F.) and long times (7 hours) for each cycle.

The reduction in the amount of broken peanuts during extraction reported in the disclosure is therefore understandable on the basis of my experimental evidence which shows that when non-comminuted nutmeats are subjected to normally gaseous fluid under high pressure and then subjected to rapid de-pressurization to atmospheric, the nutmeats may explode. During depressurization, there remains within the structure of the meat pockets of high-pressure fluid which creates a stress on the meat as the fluid attempts to escape to the surrounding low pressure atmosphere. Carbon dioxide has an extremely high vapor pressure at room temperature and has the capacity to cause extreme stresses on the nutmeat which cannot release the pressure contained in these pockets of gas quickly enough, thereby causing the nutmeat to fissure and/or explode. By destroying the fundamental cell structure through repeated humidification/drying steps, additional avenues for escape of extremely high-pressure gas are created, thereby reducing the stresses exerted on the nutmeat during depressurization. This, coupled with possible added plasticity imparted to the nutmeat by the additional humidity in it, lowers the amount of stress acting on the peanuts, and thus ameliorated the breakage problem.

Destroying the fundamental cell structure in the manner described by Passey et al., however, results in a mealy texture being imparted to the peanuts, as is well understood by anyone familiar with the effects of hydration/dehydration cycles on food texture. Thus, the peanuts defatted by a supercritical carbon dioxide extraction process would be characterized by a mealy texture which would distract from their appeal to the consumer.

Additionally, the fat remaining in the reduced-fat product produced by the supercritical carbon dioxide extraction process does not necessarily have the same chemical composition as the fat originally present in the starting nuts. According to Biernoth et. al. U.S. Pat. No. 4,504,503, supercritical carbon dioxide and supercritical propane are very useful solvents for fractionating triglyceride fats according to their molecular weight and, more particularly, their carbon number. The temperature and pressure range employed for the extraction of oil from peanuts by Passey et al. are virtually the same as those claimed by Biernoth et al. for a fractionation effect to occur. Similarly, Biernoth et al. teach that under supercritical conditions propane likewise exhibits fat selectivity based on carbon number. From the solubility and selectivity standpoint, it would thus be advantageous to carry out extraction of peanuts and the like with a solvent under conditions exhibiting complete mutual solubility with triglycerides to avoid a selective or preferential removal of the fats. While this is not difficult to achieve when liquid PBI is used as a solvent (indeed as is the case in the present invention), it is not possible to do for liquid carbon dioxide because this material does not exhibit complete mutual solubility with triglycerides. Indeed, Friedrich et. al U.S. Pat. No. 4,493,854 teaches that carbon dioxide can be made completely mutually soluble with triglycerides; only under supercritical temperatures and pressures greater than about 9,000 psi, well above the pressures contemplated by Passey et al.

OBJECTS OF THE PRESENT INVENTION

The essential object of the present invention is a process for extracting with a solvent from oil-containing nutmeats, such as peanuts and the like, a substantial quantity of oil contained therein while preserving intact their basic structure, shape, and function as human food ingredients so that the physical and textural characteristics of such nutmeats, apart from a reduced oil content, are nearly indistinguishable from those of the original raw material.

Another object of the invention is a process for obtaining by solvent extraction an at least partially defatted product as the principal product produced, with the fat or oil separated therefrom being merely a by-product, albeit an economically valuable one.

Another object is a solvent extraction process which is capable of removing oil without any discrimination on the basis of carbon number or degree of saturation of the oil and yields a solid product which contains a reduced oil content identical in constituency to the oil in the starting material.

A further object is a solvent extraction process for triglyceride containing starting material which is effective to remove the various different triglycerides in equal amount, so that the fatty profile of the removed oil as well as the solid residue is the same, other than a proportionate reduction in quantity, as the fatty profile of the starting material.

A still further object is a solvent extracted nutmeat product of significantly reduced oil content: compared to the untreated nutmeat but of otherwise nearly identical physical characteristics and fatty acid triglyceride profile.

Another object is a process for extracting nutmeats with a substantial increase in output by using as a pre-treatment step a standard roasting technique.

Yet another object is a solvent extraction process using liquefied normally gaseous solvents which are generally recognized as safe for use as food additives and which are capable of dissipating virtually completely from the extracted residue when the latter is exposed to ambient air, temperature and pressure, leaving the extracted residue nearly indistinguishable from the original material being extracted.

It is an additional object of the invention to extract from nutmeats at least 25%, and more typically 40-80%, by weight of the fat or oils originally present therein under an extraction pressure which is 1/100th to 1/10th the pressures used in the art (Passey et al), and with less than one-fifth the amount of extraction solvent.

SUMMARY AND DIFFERENTIATION OF THE PRESENT INVENTION

My invention flows from two fundamental and rather surprising discoveries: The first was that certain liquefied normally gaseous hydrocarbons have the capacity not only to act as solvents to dissolve oil but to penetrate cell walls of natural cellular oil-containing materials of appreciable size and cause oil to diffuse through the resultant broken cell walls into a surrounding continuous liquid solvent phase.

The second discovery is that these solvents being normally gaseous under room temperature and pressure have the capacity when exposed to such temperature and pressure for a reasonable time to dissipate and escape from the extracted material, even where the particles have a size equal to tens of thousands of cell diameters, in contrast to normally liquid solvents such as hexane which are virtually impossible to remove without the use of such high temperatures as would render the product virtually inedible due to burning or scorching.

The surprising nature of these discoveries can be best illustrated by reference to current technical literature. As pointed out above, comminution has long been the technique of choice for ensuring that oil-containing cellular products will give up their oil. From nearly the beginnings of extraction technology, it has been recognized that the availability for extraction of a solute from a cellular product is severely restricted unless the product is completely comminuted.

This is very clearly illustrated for the case of peanuts by the original work of Goodrum and Kilgo "*Peanut Oil Extraction with SC-CO2: Solubility and Kinetic Functions*", Trans. ASAE 30(6):1865–1868) (1987) where extractability of oil from peanuts in high pressure carbon dioxide is shown as a function of particle size. Under the conditions studied in that work, peanut halves of average diameter 10 mm yielded well under 7% oil and, significantly, a plot of this data approached an asymptote close to that value of about 7%, thereby clearly suggesting that the peanuts would yield very little more oil even if left in solvent indefinitely. Similarly, smaller peanut pieces of average diameter 3.35–4.75 mm showed an asymptotic approach at a maximum oil recovery of approximately 35%.

These authors offer the time-honored hypothesis that only surface oil is available unless the cellular structure of the product being extracted is destroyed, citing also work by Snyder et. al. (*Effect of moisture and particle size on the extractability of oils from seeds with supercritical CO2.* JAOCS 61(12):1851–1856) (1984). The latter workers obtained an increase in yield of oil extracted from soybean flakes of 66% to 97% by decreasing the flake thickness from 0.81 to 0.10 mm. In fact, Snyder et al also show asymptotic behavior as the amount of oil recovered nears these maximum values for the particle sizes in question. It was noteworthy that 90% of these maximum values was reached fairly rapidly. Most importantly, when cracked (granulated) soybeans were contacted with supercritical carbon dioxide, even under conditions of extremely high pressure, only a small percent of oil was extracted from the granules, denoting that only surface oil was extracted. Snyder et al. determined by examination of scanning electron microscope photos that the cellular structure of these granules remained substantially undisturbed after exposure to high pressure gas.

With the present invention, using liquid propane, butane, and/or isobutane solvent at approximately room temperature and corresponding vapor pressure, nearly 80% by volume of original oil has been removed from peanut halves, while for peanut pieces in the size range cited above, substantially complete extraction (residual fat content below 2%) has been achieved. It was concluded that given enough contact time and sufficient solvent, much more oil could be removed than the prior art previously believed.

To state the inventive results differently, blanched peanut pieces of 1/8" average particle have by the invention have had 98% of the oil removed therefrom. That is, 800% more oil has been removed from blanched peanut halves while preserving intact the fundamental cell structure thereof than was previously reported possible by Goodrum, for example.

Finally, compelling evidence of the surprising nature of the present invention in its ability to remove oil from products of substantially undisturbed cell structure is the many published articles which state that with either hexane or carbon dioxide, oil in solution is not transported through unbroken cell walls, and only surface oil is removed. In the light of this consensus, it is most surprising to find that liquefied propane, butane, and isobutane under pressure has the ability to disrupt cell walls of coherent cellular oleaginous materials sufficiently for effective extraction to occur.

Electron micrographs of raw as well as roasted full-fat peanuts, show that they consist of a matrix web of contiguous cell walls, within which a continuous oil phase (exhibiting a milky appearance on the electron micrograph) containing globules of protein can be seen. The cell walls appeared as an irregular web or membrane which were substantially continuous and without breaks. Electron micrograph of a partially defatted peanut revealed a matrix of cell walls, within which was empty space except for globules of protein. The milkiness which was associated with the presence of oil within the boundaries of the cell was absent. The walls, moreover, showed discontinuities and were somewhat distorted in shape, as compared with the original material. But a web-like structure of cell walls, albeit with holes in them, remained evident. This minimal damage to cell walls may explain how the natural texture of the products was retained in the material processed by this invention.

The present process has an important economic advantage over many prior extraction systems in carrying out extraction and desolventization in a single chamber or vessel, This is a cost saving in itself, given the requirement of a treatment vessel capable of withstanding relatively high pressure. Moreover, only two manipulative physical steps need be carried out on the solid substrate (nutmeats), namely, (a) introduction into the pressure chamber, and (b) removal from the pressure chamber. The invention hence avoids excessive handling of the fragile nutmeats and minimizes the risk of damage thereto. The resistance of peanuts and other nutmeats to the release of absorbed solvent immediately upon warming requires a slower desolventization process which maximizes the driving force for volatilization of PBI vapors from the particles (without making it so high as to break the particles), followed by vacuum removal of solvent in one or more stages, followed by flushing of the extractor with inert gases to facilitate degassing of the defatted solids (i.e. removal of significant solvent residue) and safe unloading of the extractor.

Original Experiment

The genesis of this invention was pure serendipity, being the result of chance in the course of a routine continuous extraction experiment. In this experiment, 300 lbs of raw, blanched peanuts containing about 50% oil were placed in an extraction chamber, which was then sealed and liquefied butane at a pressure of about 60 psi and ambient temperature was passed up-flow through the chamber at a rate of approximately one 300 lb/hr (equivalent to 1 lb/lb peanut-hr) with the objective of making a reduced-fat peanut. After the first hour of extraction, about 10 lbs of oil were recovered and after the second hour, another 6 lbs of oil were recovered. In the third hour, only about 3 lb of oil was recovered, and for each of the successive eight hours less than 1 lb of oil was removed from the peanuts. Thus, for an extraction time of 12 hours as had been planned, as total of only about 24 lbs of oil (about 8%), were recovered. At the end the rate at which oil was being extracted was too low to measure using weighing equipment on hand; it was estimated that the final micella contained only about 0.1% extracted oil.

On its face, the experiment was an obvious failure because there appeared to be no hope of removing any relatively large amount of the oil in the original peanuts. Ordinarily, the experiment would have been terminated by draining solvent from the extractor and then desolventizing the defatted solids by blowing warm solvent vapors through them. But, as it was late at night and these operations would have consumed an additional two hours or longer, it was decided simply to consider the experiment a failure, allow the system to stand overnight, and do the draining and desolventizing on the following day, On draining the extractor the following morning, one might have reasonably expected a small amount of oil, perhaps a pound or two, to be recovered from the weak micella after overnight contact. But when the overnight micella was; routinely de-solventized to recapture the solvent, it was discovered quite surprisingly that an additional 13 lbs of oil was recovered. In view of this unexpected development, it was decided out of pure curiosity to re-fill the extractor with fresh solvent and see what would happen. That evening, the extractor was drained, and upon de-solventizing another 10 lbs of oil were recovered. The extractor was re-filled and again left overnight, and when drained the next morning it was found that the micella contained 7 more lbs of oil. Another two filling/draining cycles produced 6 and 5 lbs of oil, respectively. Two final filling/draining cycles on the fourth day produced 4 lbs and 4 lbs of additional oil, respectively. All together, after about 96 extraction hours, 73 lbs of oil had been removed from the raw material, which was almost one-half the available oil and significantly more than the originally desired 25% reduction.

Reflection on the results of the original experiment led to the remarkable conclusion that even at the low treatment pressure liquefied hydrocarbon solvent had the power to slowly damage cell walls to such an extent that the solvent penetrated into the cells, dissolved the fat contained therein, and diffused through the damaged cells walls over a distance equal to thousands of cell diameters and into the bulk liquefied hydrocarbon bath. Although the extraction process was slow by prior art standards, what was most surprising was that so great a proportion of the oil could be extracted at all without major physical disruption of the peanuts to expose the oil to the solvent.

The desolventizing step revealed a second interesting discovery from that initial experiment. Normally, desolventizing of a flaked or comminuted product is carried out by slowly de-pressurizing the gravity-drained extractor, the initial expansion of some of the liquefied solvent creating a chilling effect on the drained bed of solids (or marc). Then, warm solvent vapor is blown through the bed to evaporate the cold liquefied solvent remaining in the marc. Finally, a vacuum is briefly applied to the extraction chamber to aspirate remaining vapors therefrom. Complete desolventization is indicated by a relatively rapid increase in temperature of desolventizing vapors leaving the extractor.

In the original experiment, the partially defatted peanuts were desolventized as stated above, and it was found that the temperature of vapors leaving the extractor rose surprisingly quickly (from which one might assume that the treated peanuts had retained very little solvent after gravity draining). On the belief that the desolventization was complete, the extractor was opened and unloaded. Quite unexpectedly, the unloaded peanuts gave off such massive amounts of solvent vapor that hydrocarbon vapor detection alarms provided for safety reasons were actually set off and, needless to say, unloading was most unpleasant. When tasted, the treated peanuts had a very strong and disagreeable solvent taste, as well as an effervescence in the mouth which presumably came from pockets of pressurized liquefied gas retained within the cellular structure of the nuts.

But in contrast to the explosion phenomenon encountered by Passey et al. in the CO2 extraction of natural peanuts, i.e. without pretreatment, the butane-extracted peanuts did not explode unless subjected to high heat. Apparently, the high vapor pressure of carbon dioxide (750 psi) at room temperature is sufficient to explode the peanuts, while the more moderate vapor pressure of butane (100 psi at desolventizing temperatures) was not sufficient to cause the same effect.

Some of the treated peanuts were transferred to a small oven and heated to 300 degrees F. in the hope that this temperature would drive the solvent out of the nuts. At this high temperature level, some of the nuts in the oven did explode. Others did not explode or even change shape, but when tasted after the heat treatment, a strong solvent taste and occasional effervescence could still be detected in many.

When elevated temperature failed to remove solvent from the peanuts, they were set aside in a woven bag pending final disposal. It was found, however, that the nuts slowly released the solvent without external measures. The vapor pressure of the normally gaseous solvent was evidently sufficiently high to in time force its way out of the nuts. Prior to being discarded the following day, the nuts were tasted again and found to have significantly less solvent flavor than before. After three days at room temperature in a woven bag, no detectable residual solvent flavor remained in the nuts.

Visual examination of the nuts revealed that in contrast to the very light yellow color of a full-fat (unextracted) blanched peanut, the surface coloration of a partially defatted peanut was cream colored or nearly white. When the partially defatted nuts were broken into pieces for interior examination, it was found that the lighter color extended entirely through their interior. This fact supported the conclusion that the solvent had succeeded in penetrating to the heart of the interior of the nuts and in removing fat from cells far away from exposed surfaces.

BRIEF DESCRIPTION OF THE ACCOMPANYING DRAWINGS

Figure 1B:
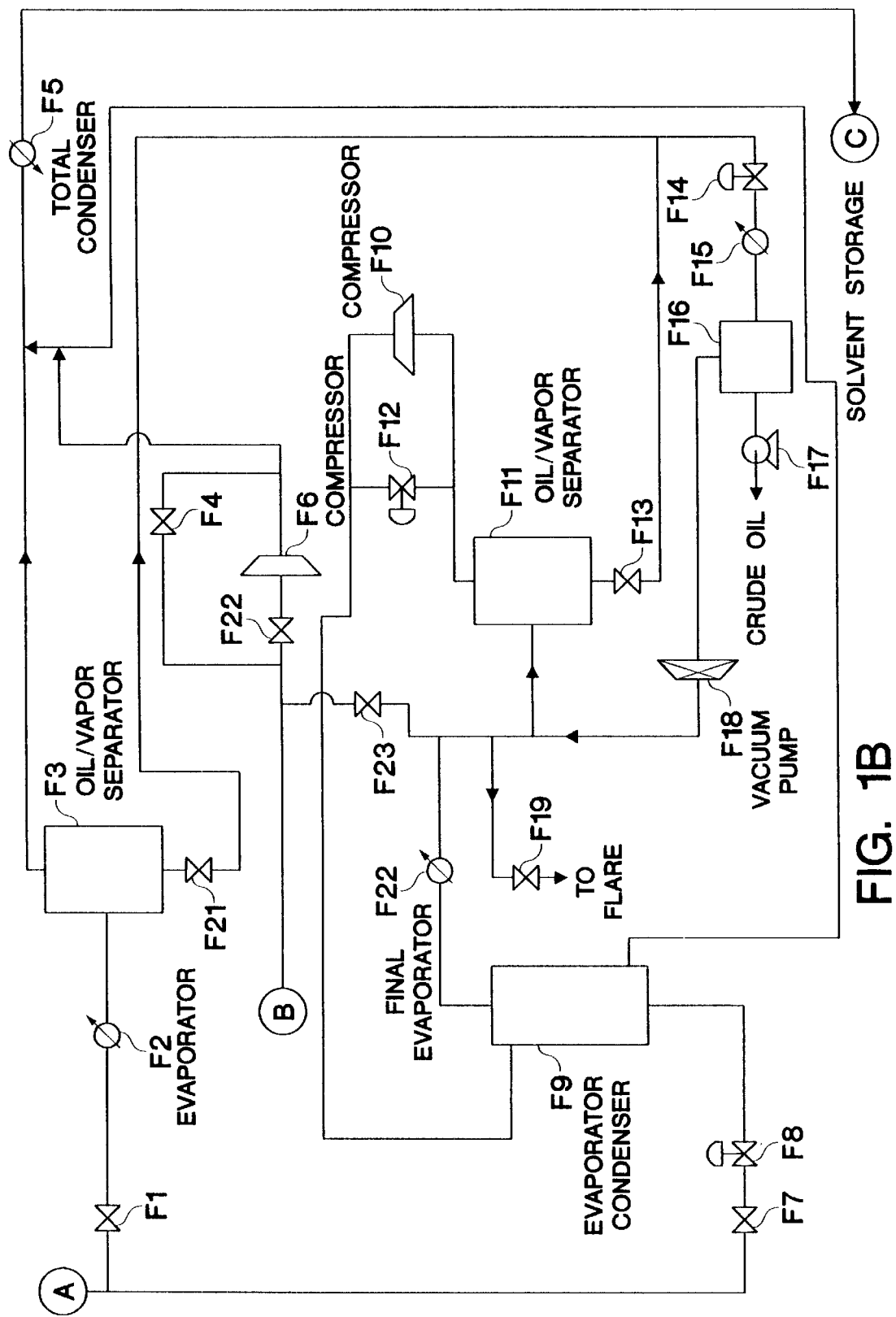

A schematic view of flow sheet of an exemplary apparatus for carrying out the process of the invention is shown in the drawing which is divided in FIGS. 1A and 1B for convenience.

DETAILED DESCRIPTION OF INVENTION

In the present process, both the extraction and desolventization steps are preferably carried out in one chamber or vessel. If desired and depending to some extent on the raw material to be extracted, more than one chamber can be employed arranged either in parallel or in series, as described below. It will, of course, be obvious that multiple vessels can be arranged in parallel to operate independently of one another, with the possible exception of a common solvent handling circuit, the different vessels being operated, e.g. in alternation, so that extraction is being carried out in one vessel while desolventization is taking place in another vessel following an earlier extraction step.

In the following description, when the term "solvent" appears, it is intended to refer to propane, butane, and isobutane or mixtures thereof, which are collectively designated "PBI" for convenience. The PBI solvents share important common characteristics and are distinguishable for purposes of the invention from other saturated hydrocarbons. The term "micella" refers to that mixture of PBI and oil which is produced when the oleaginous material is contacted by solvent. A "rich micella" is a micella which contains a relatively high amount of oil. A "weak micella" is a micella which contains a relatively low amount of oil. The term "marc" refers to that mixture of partially or fully defatted solid substrate and the solvent which adheres thereto after gravity draining but prior to desolventizing the solid particle, "Oil" and occasionally "fat" refers, as the context indicates, to either the oil originally present in the starting material or desolventized oil product.

As can be seen in FIGS. 1 and 2, the process of the invention may be constituted by several individual steps which are carried out in sequence on the raw material to produce a partially or fully defatted solid residual product and the derived free oil. These steps can be considered conveniently in terms of four general zones in my process, namely a) a solid handling zone, where solids are processed or manipulated, (b) a fluid handling zone, where micella is separated by any one of several means into recycle solvent and oil, (c) a buffer zone, where micella can be held and prepared for processing in the fluid handling zone, and serves to permit the solid handling zone and the fluid handling zones to operate independently, and (d) a vapor handling zone, which is a separate conduit system designed to carry desolventizing vapor, separate out fines, and transfer excess vapor to the fluid handling zone.

The solid handling zone consists essentially of at least one extractor holding tanks. In one preferred embodiment of the invention, the tanks would be pressurizable vessels, with entry and exit ports for raw material to be extracted, solvent, and desolventizing vapors. The vessel is equipped with a closure system, e.g. valves or the like, which allow the respective ports to be sealed in a substantially gas-tight manner. The solid handling zone also includes any appropriate mechanical equipment necessary to convey, ideally with minimum stress and breakage, raw material from storage into the extractor prior to extraction, and finished fully or partially defatted product out of the extractor after desolventization is complete. In a preferred embodiment, the extractor is a high pressure vessel 1 with a conical bottom section and top wall and valved large openings 13 and 14, respectively, in each of the top wall and bottom section to allow high pressure sealing of the unit. In one practical embodiment, the extractor basically consists of an empty vessel whose only real requirement is a capacity to withstand the vapor pressure of the PBI solvent being used at the highest ambient temperature anticipated during operation, typically in the range of 50–300 psi, but possibly as high as 600 psi.

Raw material is preferably conveyed by means of a bucket elevator, though other forms of conveyance would also work, from ground level, where boxes containing raw material are opened, to the top of the extractor 1. If the raw material were delivered in other ways, e.g. by truckloads, the trucks could dump the material into bins emptying into a suitable elevating device or conveyor. During loading of the extractor 1, the top valved openings 13 is open, and bottom valved opening 14 is closed. Knife-gate valves have been found suitable, although any positive sealing closure would be adequate for the intended purpose.

The raw material falls from the elevator through the open valve into extractor 1 until a predetermined level of solids level is reached, as detected by a probe, sensor or the like, which is usually located near the top of the extractor, at which point the feeding is stopped. So-called "point level probes" suffice for this purpose, although a continuous level transmitter can be are helpful in providing more complete; information on the level of solids in the vessel.

Once the solids reach the desired level, feeding of raw material is stopped, and the top closure is closed and sealed. A fairly strong vacuum is then preferably applied to the entire extractor in order to remove air from it, by activating a vacuum pump 39 in communication with the vessel interior via a valve 11. This air removal step serves two purposes: (a) it prevents air from accumulating in the system since air is non-condensable, and can interfere with the vapor recompression/solvent recovery system, and (b) it keeps solvent vapors free of air for safety reasons since mixtures of air and hydrocarbon vapor are highly inflammable. A suitable vacuum is about 29 inches of mercury, but this is not necessarily the only acceptable vacuum level.

On the other hand, too high a vacuum should not be applied to extractor 1, and especially not for long periods, because that would cause moisture or volatile aroma/flavor compounds endogenous in the raw material to escape, which is usually contraindicated not only from the standpoint of high finished product quality, but of proper operation of the vacuum pump as well.

It is sometimes desirable to break the vacuum by introducing a non-flammable, non-toxic, food safe gas (for example nitrogen gas, or carbon dioxide) from an External source of supply 40 through a valve 6, then closing valve 6 again to separate the inert gas source from the extractor, and finally opening valve 10 to recreate the vacuum in the extractor. This added step does not reduce the amount of non-condensable vapor buildup in the system, but it does have the virtue of substantially eliminating the potentially explosive oxygen vapors present in the system with non-oxidizing gases which do not form flammable mixtures with hydrocarbon vapors, and substantially eliminates the risk of accidental fires inside tanks.

After the desired degree of vacuum has been established in the extractor, valve 11 is closed and the extractor is filled with liquefied PBI solvent. To this end, fresh solvent can be transferred from a storage tank 37 into the extractor, by allowing the vacuum to suck solvent in from tank 37 or by pumping it via pump 38 out of the storage tank and through valves 4 and 46 into the extractor, or by some combination of both means. Although either filling technique is acceptable, it is preferred to separate the filling procedure into two discrete phases, one involving pressurization of the extractor with solvent vapor as a preliminary step, and the other involving filling with liquid solvent by positive pumping.

The extractor is preferably pressurized with vapor up to the vapor pressure of PBI solvent at ambient operating temperature conditions. Ideally use is made of vapor derived from the micella in a buffer zone tank 32, via valves 28 and 10, but the vapor can also come with a storage tank 37 through separate piping (not shown on drawing). The purpose of prior pressurization with vapor is mainly precautionary to test the extractor for integrity and leak-tightness. It is apparent that a failed closure or other problem is far easier to repair when the extractor is filled with solvent vapor rather than liquefied PBI solvent. Another advantage to filling the extractor with solvent vapor prior to introducing liquid solvent is that by introducing liquid PBI against a fully-developed head of solvent vapor, no flashing or sudden evaporation of the liquid PBI occurs with a consequential chilling effect, and the loading of solvent PBI can be carried out at an easily controlled essentially constant temperature and flow rate. If there is no evidence of extractor defects and all the seals hold when the extractor is full of vapor at the PBI vapor pressure, fresh liquid solvent is fed by means of conventional LP-Gas pumps into the extractor, normally filling the extractor in such a manner as to completely cover all of its contents.

Once the extractor is filled with both raw material and PBI liquid at the desired pressure, solvent feed is stopped, valve 4 is closed, and depending on the rare material being processed, a circulation pump 42 is activated to circulates solvent through the extractor, via valves 41, 43, 15, and filter 5. The circulating flow of solvent results in mild agitation of the bulk liquid and thereby assists in mass transfer of oil from the solid material surface to the bulk liquid phase, as well as ensuring that the contents of the extractor are at a substantially uniform composition.

Resistance to mass transfer of oil is controlled primarily by the rate of solvent penetration into intact cell walls, and by diffusional processes internal to the solid particle, i.e. the larger the minimum dimension and lower the fat content of the solids undergoing extraction at a particular point in time, the less beneficial a circulating flow of solvent is in speeding up the extraction. However, even when virtually all resistance to mass transfer is internal to the particles, at least intermittent use of circulation pump 42 ensures that the oil concentration throughout the extractor is uniform, and prevents concentration gradients from forming in the quiescent tank.

After the desired extraction contact time is over, operation of the circulation pump 42 is stopped, valves 41, 43, and 15 are closed, and the extractor is drained. This is done by opening valves 3, 33, 30, 27, and 10, turning on compressor 29 to take vapor from the top of a buffer tank 32 and deliver it into the top of the extractor. At the lower end of the extractor, a conduit connects valve 3 to a filtering device 5 and thence to the bottom (micella side) of buffer tank 32 for passing micella to tank 32. Thus, vapor being forced into the top of the extractor exerts a downward force on the liquid level, tending to drive the liquid down through the bed of solids and into the micella side of tank 32 in the buffer zone.

It can be noted in this connection that in normal operation the compressor is operated intermittently to generate the pressure to push liquid through the bed. Only a relatively low pressure is required for this drain cycle, i.e. enough the satisfy the condition that the extractor be at a higher pressure than the micella tank in the buffer. Excessive pressure buildup at the top of the extractor has the effect of pushing liquid through the bed too quickly, thereby physically pressing particulate matter into the filtering device and causing it to clog, a condition which is quite difficult to correct. Excessive pressure buildup also tends to cause compaction of solid fines into a dam which can block drainage entirely.

Once the extractor is drained of liquid, compressor 29 is stopped, and valves 30, 27, 10, and 3 are closed. The extractor is then filled again with either fresh PBI from solvent storage tank 37 by turning on pump 38 and opening valves 46 and 4, or with relatively weak micella solvent from another micella tank in the buffer zone (not shown on drawing) for a second fill/drain cycle. When the extractor is again filled with solvent, the solvent pump is stopped, and the circulating pump is turned on for either intermittent or continuous operation for a second contact time period, at the end of which the circulating pump is turned off, and the extractor is drained into yet another buffer zone tank in the manner just described above for the first cycle. After an extractor has again been drained of micella, it can be re-filled for a third cycle with either fresh PEI or micella of substantially lower oil content from a separate extraction, or from a tank in the buffer zone containing low oil content micella Once re-filled, the extractor is allowed to stand either guiescent or subjected to the regular circulating solvent flow for an additional contact period. The extractor may then be drained as before and re-filled for one or more further extraction cycles and until the concentration of fat in the solid substrate has been reduced to a desired target level.

The process of filling with solvent/micella, holding for a fixed period of time, with optional intermittent circulation of the micella, and draining is repeated as many times as necessary and the duration of contact times adjusted as necessary to achieve the desired reduction in fat level of the raw material. Each different raw material to be extracted has its own protocol, determined by experience, consisting of a number of fill/hold/drain cycles, each of such a duration that the total of the fill/drain cycles achieves an aggregate contact time and concentration driving force (differential) required to give a product with the required fat content. Examples of such fill/hold/drain cycle protocols are given hereafter for illustrative purposes to demonstrate the practical implementation of the invention.

From the above, it should be evident that the buffer zone not only allows for independent operation of the solid handling zone and the fluid handling zone, but also for storage of excess micella during the time intervals when micella cannot be introduced directly into an extractor containing solid material containing a relatively high oil content. Experience indicates that the use of a weak micella instead of fresh PBI during the early fill/drain cycles for a raw material initially very high in fat has little influence either on the rate of extraction for those cycles or the ultimate fat content (after a proper number of cycles) or characteristics of the finished product. This is because the concentration of oil in a weak micella is very low compared with its ultimate value after the exposure to fresh nuts is complete, and therefore the presence of small amounts of oil in the weak micella does not substantially affect the driving force or ultimate oil uptake into micella for that fill/drain cycle. Access to micella storage tanks in the buffer zone allows for more independent operation and for re-use of low oil content micella without the need to process the weak micella, thereby reducing the load on the fluid handling zone as well as total energy consumption.

After the completion of the fill/hold/drain protocol for the product being processed, there remains in the extractor a marc consisting of at least partially defatted extractant drenched in PBI solvent at ambient temperature and the solvent vapor pressure corresponding to that temperature. To desolventize the marc in the extractor, the following general steps are taken: (a) the extractor pressure is reduced to desolventizing pressure (depending on the choice of solvent), (b) a desolventizing operation is carried out either in one overall stage or (preferably) in plural stages along the axis (preferably vertical) of the extractor, (c) a vacuum is applied to the extractor to remove any hydrocarbon vapors, (d) the extractor is flushed with non-flammable, non-toxic gas at room pressure, and (e) the treated product is unloaded from the extractor.

Pending a more detailed description of the fluid handling zone, the following summary of its functions may be helpful. There are three such functions: (i) reception of solvent vapor at low pressure (i.e. a few inches of water column gauge pressure or higher) and recompression of vapor to high pressure, (ii) condensation of high pressure PBI vapor, and (iii) separation of extraction micella into oil and re-cyclable solvent (re-cycle PBI) by (a) by heating the micella at elevated pressure to well above the solvent boiling point at that: pressure and mechanically separating the oil and resultant PBI vapors, or (b) by a mechanical vapor recompression system, or both.

In principle, one should be able to separate micella into oil and recycle solvent directly upon draining from the extractor, but experience has shown that this makes for highly unstable operation due to (a) the batch nature of the process, (b) the different exposure times in different extractors when these are operated for a series of extractions, and (c) the different loads on the oil and solvent purification steps depending on whether the desolventizing system is operating or not. In practice, it is far preferable to simply direct the micella to either a storage tank in the buffer zone or to another extractor containing raw material of higher oil concentration than that of the micella in question. In this way, the buffer zone can feed the fluid handling zone a stable and continuous stream of micella of economically useful oil concentration at a controlled pressure.

To de-pressurize the extractor, valve 17 is opened and the vapor is transferred from the extractor being depressurized to the portion of the fluid handling zone described in (i) above at point B on the drawing. It is preferable to carry out this de-pressurization at a reasonably controlled rate and never above a pressure change of 20 psi per minute, because too high a de-pressurization rate can result in (a) breakup of solid product in the extractor due to excessive internal stress as previously described, and (b) fines being carried over into and cause damage to the compression system and create a possible risk of explosion. De-pressurization of the extractor has the effect of cooling its contents to the temperature at which the PBI solvent being used has a vapor pressure of a few inches of water column gauge. For pure n-butane this is a temperature of 35 degrees F. and for pure propane a temperature well below −15 F. In the de-pressurization step, some vapor evaporates from the marc because as the marc cools it gives off sensible heat, which in turn becomes heat of vaporization for the evaporating PBI solvent. The choice of the ratio of PBI components is in part governed by the fact that exposure to extreme cold can cause oil and moisture remaining in the product to solidify, thereby adversely affecting finished product texture. Using pure butane, it is estimated that 15% or more of the solvent remaining in the marc evaporates merely because the marc drops in temperature; with pure propane 30% or, more may be evaporated by the chilling effect. In any event, a significant amount of PBI solvent remains in the now cold marc which is now at only slightly super-atmospheric pressure, and this PBI solvent must be removed for reasons of economy and safety.

A practical desolventization system for the marc in the extractor may consist, as shown in the drawing, of a large blower 25, a heating system 24, conduits to convey vapors from the blower through the heater to an appropriate point in the extractor, on the one hand, and, on the other hand to deliver vapors from the extractor through a filtering system 21 and back into the inlet of the blower, and a connection point connecting the desolventizing conduits to that portion of the fluid handling zone described in (i) above (i.e. through valve 20 and into fluid handling zone point B). For practical operation, the desolventizer may include a bypass valve system 23 which allows for the delivery of a desired flow rate of desolventizing vapor into an extractor while the remainder of the vapor is recycled (after cooling in cooler 22) to the inlet of the blower. The entire desolventization system is connected via a regulator 26 to a vapor line coming from solvent or micella storage through valve 31 which remains continually open to give the system a continuous supply of gas. This supply is intended to make up for any vapor leaking from the system and to prevent a negative pressure from developing in the system, a condition which would risk air leaking into the system with potentially explosive results.

Desolventizing is begun by setting the heater 24 to heat desolventizing vapors to the desired temperature, opening the blower bypass valve 23 entirely, and turning on the blower 25. Next, the valves for introducing (inlet) and discharging (outlet) vapors into and out of corresponding inlet and outlet ports of the extractor are opened. Preferably multiple pairs of inlet and outlet valves are provided to enable the vapors to be delivered and removed from the extractor at selected points between its top and bottom, In the system shown for valves 2 and 6, or valves 7 and 8, or valves 9 and 12, in addition to the top and bottom pair 2, 12) but this number can be varied as desired. After the selected valve pair is opened, the blower bypass valve is partially closed. This causes the desolventizing vapors to pass through the heater and through a selected section of the extractor. In the simplest case, valves 2 and 12 are opened while valves 6, 7, 8, 9 and 10 are closed. Thus in this case desolventizing gas enters at the bottom of the extractor and exits at the top.

The desolventizing vapor temperature is ideally set to the highest point possible which would not adversely affect product quality. A suitable temperature is usually 135 degrees or less, but could be higher for more temperature-tolerant materials. Some products have a greater propensity to break, crack or explode, if the temperature is too high and too great a pressure differential between the vapor pressure of solvent being used and the desolventization pressure is allowed to develop. For these products, a low desolventization temperature is preferable, or a higher desolventization pressure if it is necessary to use a higher desolventization temperature. The mechanism of desolventizing utilizes the sensible heat from warm vapors passing through the extractor in contact with cold marc drenched in liquid PBI, causing vaporization of a small amount of liquid PBI from the marc. For example, the entry temperature of the desolventizing vapor into the extractor can be 135 degrees, and the exit temperature less than 40 degrees, but the mass flow rate of vapor out of the extractor is higher than that of vapor going into the extractor. Since some PBI in the marc is vaporized, the total pressure in the fixed volume desolventizing system tends to increase, but because of the connection between the desolventizing system and the fluid handling system, excess vapors are diverted through valve 20 into the fluid handling zone to undergo recompression, condensation and recycling, thereby preventing an actual pressure increase.

It has been found that a temperature gradient profile develops between the inlet and outlets points of the desolventizing vapors into and out of the extractor, Adjacent the vapor inlet point, desolventizing (vapor) temperature is reached rather quickly but the local temperature gradually decreases with increasing distance along the axis of the extractor away from the inlet point until a "break point" is reached. From this point, the temperature in the extractor drops dramatically to the boiling point of the PBI solvent at the operative desolventizing (i.e. near-atmospheric) pressure. This break point is the "front" of the temperature gradient, below which the marc is substantially fully desolventized, and above which little or no desolventization has taken place. The, desolventization front rises progressively along the length (height) of the extractor as desolventization proceeds until an upper limit is eventually reached adjacent the outlet of the desolventizing vapors. This is usually the top of the extractor but could be some intermediate point dependent upon the choice of the valve pair for the vapors. The approach of the end of the desolventizing process is indicated by a reduced flow rate of gas at the connection point between the desolventizer and the fluid-handling zones, as well as a lower load on the PBI compressor and a lower load on the condenser.

Depending to some extent on the material undergoing extraction, it is preferred to provide multiple points for desolventizing gas to enter and exit the extractor along its vertical axis. This extractor configuration is preferred for either fairly small flakes or particles of raw materials which are wither brittle or tend to flex under weigh. The configuration is also preferred in large scale applications where the extractor height is in excess of about 10 feet, and this configuration is mandatory if the water activity of the food being defatted is high. The desolventization process relies on the heated vapors giving up their sensible heat and transferring it in the form of latent heat to solvent in the marc.

Since latent heat of vaporization is two orders of magnitude greater than sensible heat (on a pound for pound per degree basis), a comparatively very large amount, measured both in pounds and cubic feet, of gas needs to be pass through the marc to supply the required energy, Some products of fairly small size compact sufficiently in tall beds to create significant resistance to flow which can result in a pressure drop large enough (e.g. about 7 psi) interfere with blower operation, cause unwanted condensation of solvent in desolventizer lines, (if ambient temperature is low enough), migration of moisture toward one end of the bed (in high water-activity foods), and, possible product breakage.

In addition, such a pressure drop along the bed during desolventizing results in a lower driving force for evaporation due to higher boiling point of solvent at the higher pressure at the bottom of the bed (this effect is particularly troublesome when the solvent is rich in butane and isobutane as opposed to propane). A high pressure drop through the bed also calls for heavier and more costly gauge conduits for delivering desolventizing vapors to the extractor to withstand the higher pressure.

In addition to heat sensitivity and fragility, another important property which governs the choice of desolventizing temperature is moisture content, and in particular the water activity of the product. Blowing large quantities of hot vapor through a warm and then a cold mass of mid-to-high water activity solids results in the net transfer of endogenous moisture from the area of entry of the desolventizing vapor to the area of exit, even when the desolventizing temperature is fairly low. I have found with some products which start at 8% moisture that if a simple desolventization at 135 F. is carried out using only valves 2 and 12, by the time desolventization was complete the bottom of the extractor contained product at 5% moisture and the top of the extractor contained product at 13%, end areas which were soggy with condensed moisture. This problem is serious where there is a significant amount of moisture in the raw material, e.g. in raw nuts. When roasted nuts are used as raw material the problem does not exist since the moisture content is less than 2%. Hence when raw nuts are used as raw material, the preferred desolventizing sequence used is valves 9/12 first, then valves 7/8, and finally valves 2/6. This limits the potential migration of endogenous moisture in the desolventizing step, which is extremely important since microbial growth in food occurs in high moisture environments and growth of anaerobic bacteria made possible under these circumstances poses a potential danger for public health.

Finally, once a particle has been desolventized, further exposure of that particle to the heated vapors is wasteful. Progressive elevation during the desolventizing process of the lower boundary of the desolventizing region of the extractor would avoid the need to blow desolventizing vapors through an entire extractor height 100% of the time after lower portions have been desolventized. While a true progressive elevation of the lower boundary is conceivable, it would be complicated, and an approximate solution to the problem can be achieved by providing multiple vapor entry and exit points along the length (height) of the extractor.

As an illustration, entry points might for a 15 ft. high extractor can be located 0, 4 and 9 feet from the bottom of the bed (corresponding to entry points for valves 2, 7, and 9 in FIG. 1), and exit points at 5, 10, and 15 feet from the bottom of the bed (corresponding with exit points for valves 6, 8, and 12 in FIG. 1). At the beginning, vapors are blown into the bottom region of the bed (through valve 2) and withdrawn five feet from the bottom of the bed (through valve 6). When desolventization is completed in this region of the bed, vapors are introduced at the inlet four feet from the bottom of the bed (through valve 7), and withdrawn at the outlet 10 feet from the top of the bed (through valve 8). When desolventization of this region is complete, vapors are introduced at the entry point 9 feet from the bottom of the bed (through valve 9), and withdrawn at the exit point at the top of the bed (through valve 12). In this manner, the height of bed offering resistance to flow from the blower is reduced substantially, allowing the same horsepower blower to deliver more desolventizing vapors through the extractor for a given pressure drop across the blower.

This progressive method of desolventization also is advantageous when it is desired to reduce the exposure time of the product to relatively warm temperature. The number of multiple entry and exit points can be varied; the greater the number the better the control over the desolventizing action but the greater the equipment cost.

For solid particles with a minimum dimension below $\frac{1}{32}$", finishing and unloading are simple. Once the desolventization is complete, the valves between the desolventizing unit and the extractor (i.e. the active pair of valves 2, 6, 7, 8, 9, and 12) are closed to isolate the extractor, and vacuum pump 39 is turned on and a vacuum is created in the extractor by opening valve 11 to remove hydrocarbon vapors. The extractor is then brought up to atmospheric pressure by admitting a non-flammable, non-toxic, non-oxidizing gas from source 40 through valve 6. When the extractor has reached atmospheric pressure, valve 6 is closed and bottom closure 14 is opened and the extractor is unloaded by dumping its contents into either a suitable receptacle, e.g. tote bags, or an appropriate means of conveyance to storage/packaging areas.

When the preferred solid material having a minimum dimension greater than $\frac{1}{32}$" is desolventized, the completion of desolventization becomes more complicated. If the temperature of the material in the extractor during the course of desolventization rises to 135° F., that fact alone is not a reliable indication that desolventization is complete or even nearly so. Even products which desolventize "relatively" quickly (e.g. peanut granules $\frac{1}{8}$ inch) retain more solvent than can be explained on the basis of vapor pressure and void volume alone. It has been found that almost all desolventized products with a minimum dimension of at least $\frac{1}{32}$ inch and an intact natural fundamental cell structure need to be subjected to a vacuum, preferably greater than 29" mercury for at least 5 minutes, and usually somewhat longer, before they can be considered fully desolventized.

However, the application of a continuous vacuum to warm or hot processed food material will have a tendency to aspirate from the material moisture and desirable aroma materials in addition to solvent. There are two approaches to degassing which are deemed practical. First, one can simply extend desolventizing for a long enough time (usually equal to that time at which no flow is detected at the interconnection point between the desolventizing zone and the fluid handling zone, i.e. no flow can be detected through open valve 25). Then, the extractor can be safely unloaded, by the procedure described below, including inert gas flushing. The nearly finished product is then "tempered" by allowing it to sit in a dry atmosphere of air or, preferably, inert gas, for a period of time, such as one day or (usually) more, until substantially free of solvent.

An alternative approach to finishing desolventizing is to desolventize until no flow is detectable at the interconnection point between the desolventizing zone and the fluid handling zone i.e. at valve 25, and then isolate the extractor. Vacuum pump 39 is activated and valve 11 opened to apply a strong vacuum (at least 29 inches mercury) to the extractor for a brief period of a few minutes, Then, pump 39 is isolated from the extractor by closing valve 11 and allowing the pressure to build up in the extractor due to diffusion of solvent from the extracted material to the void space in the extractor. After the pressure builds up somewhat, the extractor is again subjected to strong vacuum from pump 39 for a brief period by opening valve 11 and then disconnected from of the vacuum pump by closing valve 11. Once more, the pressure is allowed to build up naturally in the extractor with solvent vapors escaping from the extracted product.

The cycle of brief exposure to vacuum, followed by gradual pressure build-up is repeated until the product is substantially free of solvent. The extractor is then subjected to a final evacuation and brought back to atmospheric pressure by introduction of an inert gas from source 40 through valve 6. The extractor is now ready to be unloaded by opening closure 14 and emptying the extracted product into a suitable container, e.g. tote bags, or onto an appropriate conveyor means for delivery to storage and/or packaging.

The safety measures described herein are not necessary to achieve the functional goal of the invention but are advisable from a practical standpoint to minimize hazard to both the equipment and operating personal. PBI readily react with oxygen, including that in air, which can result in combustion or even explosion. The lower explosive limit of these hydrocarbons in air is in the neighborhood of 1.5%. A mixture of hydrocarbon vapors in air requires only a spark to set off an explosion, and grain dust is highly static-generating. Of course, all equipment used in practicing this invention should ideally be explosion-proof, and all alarms and precautions normal for a facility handling hydrocarbons should be provided for safety reasons. Even so, a spark can always occur and indeed is a serious risk. If one does not evacuate the extractor after completion of desolventizing, then when the extractor is unloaded through closure 14 a large amount of flammable hydrocarbon vapors will be released into the plant atmosphere, again creating a hazard. If after being evacuated, the extractor is brought back to atmospheric with air, unless the vacuum was sufficiently strong and of sufficient duration to have removed substantially all of the residual hydrocarbon, the hydrocarbon/air mixture will most likely be flammable or explosive. Even if the vacuum is sufficiently strong to remove virtually all hydrocarbon vapors from interstices between the particles, this does not necessarily eliminate the explosion hazard.

It has been found many foods, particularly nutmeats with minimum dimension greater than $\frac{1}{32}$ inch, can retain vapors even after being subjected to a very high vacuum of say 29.9 inches mercury because the vapors entrapped in the food matrix must follow a tortuous path to escape. For this reason, it is recommended that the measures described above be employed in unloading the extractor. Depending on the product being processed, several cycles of evacuation and gradual re-pressurization may be needed for effective removal of hydrocarbon vapors. It is advisable as noted that the final re-pressurization be with an innocuous, food-safe non-flammable gas, preferably nitrogen or carbon dioxide. With such a gas, the presence of even fairly significant amounts of hydrocarbon vapors in the product can usually be tolerated because the addition of an inert gas takes the mixture out of the explosive range. Absent the release of huge amounts of vapors from the product which is unlikely if proper measures are followed, the blanketing of the extractor with non-toxic, non-flammable, food-safe gas renders the vapor mixture harmless and assures safe unloading.

Taking as a simple example the extraction of oats, although oats are not a preferred subject for the invention, a total of two fill/drain cycles with fresh solvent will normally suffice to reduce the total fat content to below 1%. Typically, for a charge of say 3,500 lb. of rolled oats, about 500–600 gallons of PBI are used per fill/drain cycle. Thus a total of say 1,200 gallons of fresh PBI are used to bring 3500 lb. of oats from an initial fat content of 6% to less than one percent. This corresponds, at a PBI solvent density of about 5 lb./gal, to a solvent-to-feed ratio of 1.7 to 1 on a weight basis, a ratio which, while higher than that of a conventional hexane-based process, is not excessive.

For extracting other products, however, the total solvent to feed ratio can be much greater. For producing partially defatted roasted almond medium size granules to a fat content specification below 15%, it may be necessary to use 5 fill/drain cycles, for a solvent to feed ratio of 3.8–4:1. The consumption of fresh solvent is highest for extracting roasted and finely chopped peanut granules from their endogenous 50% fat content to below 2%. Around 7 fill/drain cycles are required to accomplish this task properly, for a solvent-to-feed ratio of around 5:1, when stated on an incoming peanut basis. On an outgoing defatted peanut granule basis, the actual values are even higher because removal of the oil substantially lowers the product weight. At a stage when the peanut granules are nearly oil-free, down from endogenous oil content of around 50%, the total solvent-to-product ratio will be around 10:1. The load on the fluid handling zone is therefore very high, and the micella in the final stages will be very weak in oil, making the use of fresh solvent for each cycle relatively uneconomical.

In modern soybean extraction plants, hexane solvent is countercurrently passed through plural beds of substrate (i.e. extraction material) which are translated bodily around a fixed axis. Thus, the weakest micella is placed in counter-current extraction against the highest oil-content substrate, and vice versa. In the present process, the fill/drain cycles are carried out not by translating beds of substrate but by moving the micella between separate working extractors in such a manner as to create a counter-current effect, with timing inconsistencies buffered with micella storage tanks.

The above may be illustrated by a procedure for defatting peanut granules. Starting with very darkly roasted, blanched, finely chopped peanut granules of minimum dimension $\frac{1}{32}$ inch and containing 50% fat, the extractions begin by contacting the granules in the extraction vessel with PBI solvent for four hours, then draining the micella. At the initial stage (cycle) of the extraction, the granules give up large amounts of oil quite easily, and the micella recovered is thick with oil, containing 15% or more oil by weight. Following this first extraction is an eight hour contact period (second cycle) using fresh solvent. When drained from the extractor, this micella also comes out thick with oil. After the second cycle, internal resistance to mass transfer of the oil increases, calling for more stringent conditions and the third and fourth cycles are lengthened to 12 hours each and the fifth and sixth cycles are lengthened to 24 hours each. After the fourth or fifth cycles, the peanut granules contain relatively little oil, but are not totally defatted, and the micella is quite low in oil content, say about 1–5% oil. This weak micella, however, is well suited for use as the initial solvent in a subsequent extraction operation since there is ample capacity within the micella to remove substantial oil from a next batch of granulated peanuts in a first, second, or even third extraction cycle. Fresh solvent is needed only in late cycles when the remaining oil content is low and a strong extraction capacity is demanded to ensure that the fat content is driven down to nearly zero.

This general pattern of cycles can be adjusted to fit particular product requirements. An example is a partial defatting of sliced almonds. Sliced almonds are used in breakfast cereals and in bakery products and are nearly always sold to the producer in a raw form, not roasted, because raw almonds are more durable and resistant to wear and tear during shipping, handling and transport, and downstream processing. To reduce the fat content of raw almond slices on a weight basis by 50% from a starting level of about 55% oil takes approximately four days (or 96 hours) total contract. In this case, each cycle is 24 hours in length, and with the system operating countercurrently and using micella from the final cycle of a prior extraction to extract the incoming raw material, relatively little loss in extraction efficiency has been observed compared with the use of fresh PBI solvent for each fill/drain cycle. When operating countercurrently in this manner, the fluid handling zone over a series of extractions is spared a substantial load.

The ultimate function of the fluid handling zone is to provide for recovery of PBI for re-use as fresh solvent. Recoverable PBI can take two forms: (a) a primary form as liquid micella formed of solvent mixed with oil either as drained directly from the extractor or stored in the buffer zone, or (b) a secondary form as residual liquid solvent remaining inside or on the surface of drained marc (extracted product). In either case, two conditions must occur to recover the PBI: (1) the PBI must be separated from either the oil or the marc, as the case may be, and (2) the PBI must be vaporized, at such a pressure where it can be condensed with conventional cooling water (if necessary through a compression step), and re-condensed.

For secondary desolventization to separate the PBI from the marc, solvent vapor is circulated through the marc at a temperature well in excess of the boiling point of the PBI mixture at the operating pressure of the extractor during the desolventization process. Thus, the circulating vapors lose sensible heat, while the liquid PBI on the marc gains an equal amount of latent heat, and a corresponding amount of PBI on the marc evaporates, causing gas flow through valve 20. When a desolventizing pressure is selected higher than extraction pressure, then the excess vapor produced during desolventization needs only to be condensed. If desolventization of marc occurs at reduced pressure relative to the extraction, then the excess vapors produced during desolventization need to be re-compressed and condensed. Most preferably, secondary desolventization of marc takes place at about the same pressure as primary desolventization of the oil. Thus, both marc and micella vapors can be re-compressed in the same compressor at the same time.

Separation of PBI from oil in micella can be done by either of two approaches. The simplest way is merely to drive off solvent as vapor by boiling micella under elevated pressure (i.e. near the pressure maintained in the buffer zone) by means of heat, and then condense the vapors into pure PBI. This mode, while simple in concept is the most costly in terms of energy consumption and is best avoided. A more economical and preferred alternative is to reduce the pressure above the micella to a level causing enough solvent evaporation to chill the micella. Heat from one of several sources (including the surrounding atmosphere) can then be used to provide the energy required to boil the PBI at the reduced pressure away from the oil. Once evaporated, the PBI vapors can be re-compressed in a compressor to condenser pressure, at which point the PBI can condense and be ready for recycling.

The lower limit of temperature to which the micella should be flashed (evaporated) is determined by the melting point of the fat or oil contained therein. The micella should be flashed cold, although not cold enough to solidify the oil and cause problems in clogging pipes and heat exchangers. Most nut meat oils are fairly unsaturated and therefore amenable to flashing at fairly low temperatures. The exception to this is desiccated coconut, whose oil is solid even at room temperature, and whose micella must be processed by simple evaporation.

Reference may now be had to FIG. 1B which gives a schematic representation of a fluid handling zone useful for the invention. Micella from point A in the buffer zone of FIG. 1A can take one of two routes: either through valve F1 or through valve F7. In the simplest mode for separating micella into PBI and oil, the micella flows through valve F1 into evaporator F2 where the PBI is evaporated from the oil by heating. The vaporized PBI is physically separated from the oil in an oil/vapor separation tank F3, which preferably includes a de-misting device of known type. The vapors then flow into condenser F5, where the PBI is cooled and condensed for return to solvent storage tank 37 (FIG. 1A). Oil from the bottom of oil/vapor separator tank F3 leaves the tank via valve F21 for delivery to an oil finishing station, described in detail below. The latter approach to treating micella is very energy and water inefficient, as every pound of PBI must be evaporated using external energy above ambient temperature (hence requiring steam, hot water, or electricity for heating), without an opportunity to recapture the heating energy for useful purposes. It is the only way to process coconut oil micella.

In an alternative and preferred mode, micella under extractor operating pressure is made to flow through a large-bore valve F7 into a flash valve F8, where the micella is flashed down to a lower pressure, perhaps as low as a few psig. Flashing causes some of the PBI to vaporize from the micella while the rest remains liquid but becomes chilled by the expansion of the evaporated fraction. This cold micella is then introduced into one side of evaporator/condenser F9 to the other side of which re-compressed PBI vapor is supplied for condensation. Since the heat of vaporization and heat of condensation of PBI are the same, the bulk of the energy for evaporation comes from the heat of condensation released by the condensing vapors.

Exiting from the evaporation side of F9 is a mixture of PBI vapor and a very rich micella. This mixture is heated in a final evaporator F22 to a temperature high enough to drive a major portion of PBI vapors from the oil phase. The oil/vapor mixture enters oil/vapor separator F11 which preferably includes a known de-misting device. The oil separates from the mixture and settles to the bottom from whence it can be withdrawn through valve F13 for delivery to an oil finishing station described below. The PBI vapors leave the oil/vapor separator F11 and flow into a compressor F1, which compresses the vapors to above the pressure of solvent storage tank 37 (FIG. 1A). The compressed vapors are condensed in condenser F9 by giving up their heat of condensation to boil the micella. The now mostly condensed PBI then flows through a final condenser F5, where any remaining vapor is condensed, and the fully condensed liquid PBI is then transmitted back to solvent storage tank 37 (FIG. 1A) at point C.

Preferably, low pressure oil/vapor separator F11 is held at about 0–5 psig, and preferably about 2 psig, to prevent any vacuum from forming in the system which might aspirate air into the system and interfere with condensation in condensers F9 and F5. In order to maintain the pressure in separator F11 at the desired level, compressor F10 is provided with a bypass valve F12 which operates automatically in response to signals generated when senors detect a deviation in the pressure in separator F11 from a desired set-point. Higher pressures can be used in this circuit depending on the ease with which the oil solidifies, the vapor pressure/temperature relationships of PBI mixtures being used, climactic conditions, cooling water temperature, and like factors.

Before the oil passing through valves F21 and F13 is ready for re-use, it is vacuum-finished and deesolventized. To this end, it flows via a metering valve F14 into a heater F15. where it is heated to a fairly high temperature under vacuum created by vacuum pump F18 to insure removal of any small amount of entrained vapor and thence to a separator tank F16 where any vapor flashed-off in this manner is separated from the oil. Separator tank F16 is connected to vacuum pump F18 and vapors sucked off by the vacuum pump are discharged upstream of the low-pressure side of compressor F10, if the low pressure side of this compressor is at a relatively high pressure, the small amount of vapor pulled off in the finishing step may be routed into the flare F20 and burned. The completely desolventized oil obtained in tank F16 is then pumped by means of a small positive displacement pump F17 into drums or tanks for storage until shipped for refining.

It is preferred that the marc desolventizer be operated at the same pressure as the micella separation unit, i.e. at as low a pressure (above atmospheric) as practical, in order to obtain maximum the temperature differential available for vaporization of PBI. Thus, excess gas coming from the marc desolventizer through valve 20 is preferably routed to point B in FIG. 1B, and from the latter point to a point upstream of compressor F10, shown in FIG. 1B as the inlet to oil-vapor separator F11. This minimizes equipment expense and minimizes complications in operation. Where, as is usual, at least 50% of the solvent is butane or isobutane, there is no problem with this approach.

When the pressure in the marc desolventizing system is either below or very different from the pressure in the micella processing line, vapor coming from the desolventizer needs to be separately and independently compressed. To this end, it can be routed through valve F22 into compressor F6; and after compression there into condenser F5. In rare instances where the marc desolventizer operates at a significantly higher pressure than the solvent storage system, vapors coming through valve 20 in FIG. 1A are routed through valve F4 and directly into condenser F5.

Variations from the arrangement seen in the schematic flow sheet are of course possible, such as, for example, routing vapors from point B directly into the low pressure side of compressor F10, instead of through an oil/vapor separator tank. Such changes make little or no difference in the function of the invention, and are hence within its scope.

Effect of Pre- and Post-Processing

The extraction process disclosed above is effective with such products as blanched raw peanuts, sliced raw almonds, raw cashews, and raw pecan pieces, raw cocoa pieces, and many other products of a size such that the internal cell structure is in substantially natural state. However, the extraction of such products is extremely slow, requiring sometimes up to a week of extraction time and large periods of time under vacuum for desolventizing and degassing. Fortuitously, it has been found that these long processing times can be very dramatically reduced, often by more than 50%. by pre-roasting the material, either in oil, or in air, or in any non-toxic gas. It is suspected that the roasting process weakens the cellular walls sufficiently to promote solvent penetration. Interestingly, prolonged roasting does not produce a commensurate reduction in processing time. A light (brief) roasting of peanut halves to a golden color reduces extraction time nearly as dramatically as a heavy (lengthy) dark roasting, and for the same extraction conditions results in nearly the same final content of fat (oil). In this connection, it has been found that the flavor and texture of the finished product are dramatically affected by the order of treatment and its degree of severity. For example, partially defatted raw peanuts tend to have a pronounced "beany" flavor. Roasting the full-fat (unextracted) peanuts to a degree producing a typical commercial roasted peanut flavor and a light brown surface color reduced extraction time needed to achieve a 25% fat reduction by about 70%. The extracted and desolventized roasted nuts have a very bland peanuty flavor and an almost white surface color. This white color may be attributed to a gradient in fat content developing in the peanut particle during extraction. The outside surface of the peanut naturally receives the most extensive reduction in fat, whereas the center of the peanut particle is subjected to the least amount of extraction because of the time required for solvent to break through all of the cell walls to reach the interior.

The flavor of the white-colored partially defatted peanut is very bland. This can be explained by the fact that flavor components adjacent the surface of the nut are drastically reduced by the extraction so that intense nutty flavor initially experienced on biting a peanut is lost. However, the usual nutty aftertaste is clearly discernible and as nearly strong as that experienced with a roasted full-fat peanut.

Similarly, almond slices or granules which have a pale yellow color when raw and a brown/golden color when roasted undergo a like color change and after extraction have a white appearance. In the case of almond slices, the appearance is almost chalky, except where the skin remains and retains its usual dark brown skin color.

Two ways have proved useful for achieving a good quality product in terms of flavor and color. First, one can heavily pre-roast the nuts to an extent that even after extraction a strong flavor remains. This generally is done by roasting the raw material to nearly the scorching point, and sometimes beyond. In this case, the resultant partially extracted product has a pale yellow (rather than white) color, and has a good nutty flavor. This approach is indicated especially where re-introduction of fat is impermissible, e.g. for "fat-free" products.

An alternative which gives better flavor and texture results for partially defatted whole nuts is to lightly roast the raw nuts (to make the extraction process relatively efficient) and then carry out another roasting after extraction. Unexpectedly, oil-roasting an extracted nut does not result in a high uptake of oil. For example, when partially defatted almonds are re-roasted in oil, the fat content increases ten percent. This alternative approach, consisting of pre-roasting, extraction and a light post-roast, produces a finished product of good color and flavor because oil taken up in a post roast in oil tends to be concentrated at the nut surface and enhances the initial nutty taste sensation. From a caloric standpoint, the use of low calory oil analogues, such as fatty acid esters of sugars which are not digestible, is advantageous.

In the case of cashews, roasting prior to extraction has an additional beneficial effect as regards the appearance of the product. Raw cashews have a generally uniform white/pale yellow color. When extracted with PBI, the cashews change to white/beige, with non-uniform grey areas scattered over the surface. These non-uniformities adversely affect visual appearance. By roasting the cashews prior to extraction, not only is the rate of extraction substantially increased, but the surface discolorations appear to be less intense, leaving a more uniform white color. Pre-roasted cashews are also considerably quicker and easier to desolventize and degas than are raw cashews.

In general, when granular product is called for, granulation prior to extraction is desirable since a reduction in particle size reduces the extraction time to achieve a given fat content. While pre-roasting was generally desirable to reduce extraction times, in some instances non-roasted raw material underwent extraction almost as readily. Hence, for pecan pieces about ¼ inch in minimum dimension, while roasting does improve the rate of extraction, raw pecan pieces also responded quite well to extraction down to fat contents as low as ⅓ that of the original level or even below. On the other hand, for almonds the difference between raw and roasted raw material, even when pre-blanched, is substantial; more than twice the process time is necessary for the same fat reduction. To reduce the fat content of raw almond splits, even after blanching, by about 25% requires about 5 or 6 days. Invariably, the presence on the nuts of their natural skin envelope prevented with extraction, as might be expected, but pieces covered partially with skin but with exposed (i.e. skin-free) surfaces responded to extraction substantially the same as totally blanched pieces.

Examples of the Invention

The invention is illustrated by the following examples in which the contact time for the extraction cycles employed therein is given, each cycle being preceded by a solvent fill in an amount sufficient to immerse the feed material, the solvent being fresh solvent unless otherwise specified, and followed by a micella drain.

EXAMPLE 1

Raw Blanched Peanuts

Raw blanched runner split peanuts with 42% fat were subjected to room temperature extraction and about 100 psig with a mixture of 30% propane and 70% butane according to the following protocol: Load extractor and seal; Evacuate and vapor fill; Cycle 1–8 hr; Cycle 2–8 hr; Cycle 3–12 hr; Cycle 4–24 hr; Cycle 5–24 hr; Cycle 6–24 hr; Cycle 7–24 hr; Desolventize at 115 F.; Evacuate and hold 5 min; Isolate 4 hr; Evacuate & hold 5 min; Isolate 8 hr; Evacuate & hold 5 min; Isolate 8 hr; Evacuate and hold 5 min; Isolate 12 hr; Evacuate & hold 5 min/Isolate 12 hr/Evacuate & hold 5 min; Isolate 12 hr; Evacuate; Flush with Nitrogen; Unload. The finished product contained 27% fat and had a raw peanuty flavor with a slightly beany aftertaste. The fat content reduction was about 49% by volume, 36% by weight.

To determine whether the extraction had been selective or unselective toward any particular fatty acids or group thereof, a detailed fatty acid profile was carried out on both the extracted oil and on the oil endogenously present in the raw material by grinding raw peanuts and subjecting them to an exhaustive soxhelet extraction. The oil samples were hydrolized and the fatty acid profile measured using a standard HPLC analysis.

TABLE 1

| Fatty Acid | Percent in Oil In Raw Peanuts | Percent In Oil In Deffated Peanuts | Difference % |
|---|---|---|---|
| C4:0 | 0.0 | 0.0 | 0.0% |
| C6:0 | 0.0 | 0.0 | 0.0% |

TABLE 1-continued

| Fatty Acid | Percent in Oil In Raw Peanuts | Percent In Oil In Deffated Peanuts | Difference % |
|---|---|---|---|
| C8:0 | 0.0 | 0.0 | 0.0% |
| C10:0 | 0.0 | 0.0 | 0.0% |
| C11:0 | 0.0 | 0.0 | 0.0% |
| C:12:0 | 0.3 | 0.0 | 0.3% |
| C13:0 | 0.0 | 0.0 | 0.0% |
| C14:0 | 1.3 | 1.4 | 0.1% |
| C14:1 | 0.4 | 0.5 | 0.1% |
| C15:0 | 0.0 | 0.0 | 0.0% |
| C15:1 | 0.0 | 0.0 | 0.0% |
| C16:0 | 0.8 | 3.7 | 3.1% |
| C16:1 | 0.7 | 0.8 | 0.1% |
| C17:0 | 0.0 | 0.0 | 0.0% |
| C17:1 | 0.0 | 0.0 | 0.0% |
| C18:0 | 18.7 | 17.9 | 0.8% |
| C18:1 CIS | 13.0 | 13.4 | 0.4% |
| C18:1 TRS | 0.7 | 0.9 | 0.2% |
| C18:2 CIS | 10.4 | 10.3 | 0.1% |
| C18:2 TRS | 1.3 | 1.6 | 0.3% |
| C18:3 O-6 | 0.6 | 0.7 | 0.1% |
| C18:3 0-3 | 0.1 | 0.2 | 0.1% |
| C20:0 | 17.9 | 17.7 | 0.2% |
| C20:1 O-9 | 8.3 | 8.6 | 0.3% |
| C20:2 CIS | 1.9 | 4.8 | 3.1% |
| C20:3 O-6 | 0.6 | 2.9 | 2.4% |
| C20:3 O-3 | 2.7 | 1.0 | 1.8% |
| C20:4 O-6 | 2.3 | 1.8 | 0.5% |
| C20:5 O-3 | 1.1 | 0.6 | 0.5% |
| C21:0 | 0.0 | 0.0 | 0.0% |
| C22:0 | 6.6 | 6.4 | 0.2% |
| C22:1 O-9 | 1.4 | 1.2 | 0.2% |
| C22:2 | 0.6 | 0.6 | 0.0% |
| C22:6 O-3 | 0.3 | 0.2 | 0.1% |
| C23:0 | 0.0 | 0.0 | 0.0% |
| C24:0 | 2.0 | 2.2 | 0.2% |
| C24:1 O-9 | 0.5 | 0.6 | 0.1% |

As seen from Table 1, there was no substantial compositional difference between the oil remaining in partially defatted peanuts and the oil the raw material.

EXAMPLE 2

Lightly Roasted Blanched Peanuts

Commercial blanched roasted (to a light brown color) runner split peanuts measured at 46% fat subjected to room temperature extraction with a mixture of 10% propane and 90% butane at about 70 psig pressure according to the following protocol: Load & seal; Evacuate & vapor fill; Cycle 1–4 hr; Cycle 2–8 hr; Cycle 3–12 hr; Cycle 4–24 hr; Desolventize at 135 F.; Evacuate & hold 5 min; Isolate 4 hr; Evacuate & hold 5 min; Isolate 8 hr; Evacuate & hold 5 min; Isolate 8 hr; Evacuate; Flush with Nitrogen/Unload. The finished product contained 24% fat and had a mild peanut flavor with a distinctly pleasant, bland peanut aftertaste. The texture was dry, but crunchy and pleasant. The fat reduction was about 63% by volume, 47% by weight.

EXAMPLE 3

Very Dark Roasted, Blanched Peanuts

Commercial blanched very dark-roasted runner split peanuts with about 50% fat were subjected to room temperature extraction with a mixture of 10% propane and 90% butane according to the following protocol: Load & seal; Evacuate & vapor fill; Cycle 1–4 hr; Cycle 2–8 hr; Cycle 3–12 hr; Cycle 4–48 hr; Desolventize at 135 F.; Evacuate & hold 5 min; Isolate 4 hr; Evacuate & hold 5 min; Isolate 8 hr; Evacuate & hold 5 min; Isolate 8 hr; Evacuate; Flush with Nitrogen; Unload. The finished product contained 17% fat and had a strong, distinct peanut flavor and aftertaste, and a crunchy, albeit somewhat dry, texture. The fat reduction of the product was about 80% by volume, 66% by weight.

EXAMPLE 4

Medium Dark Roasted, Blanched Peanuts

Blanched, dry-roasted (to a dark golden color) granulated peanuts, chopped to a particle size of about 3/16 inch, were subjected to room temperature extraction at about 60 psig pressure with weak butane-peanut oil micella followed by pure butane. The protocol was; Fill & seal; Evacuate and vapor fill; Cycle 1—Weak micella (consisting of a mixture of micella recovered from the second and third cycles from another extraction using and estimated to contain less than about 5% extracted oil)—4 hr; Cycle 2—pure butane—8 hr; Cycle 3—pure butane—24 hr. The extractor was then depressurized by venting vapor until it reached slightly super-atmospheric pressure and quite cold temperature and the granules were desolventized by blowing warm solvent vapors through the extractor at 130 F. The extractor was next evacuated to 29.5" Hg, and isolated and held for 12 hours. Vacuum was re-applied to reach 29.5" Hg, followed by a second isolation and hold for 12 hours. A final vacuum to 29.5" Hg was applied and relieved to atmospheric pressure with nitrogen gas, and the granules were unloaded from the extractor. The original fat content of the nut particles of 51% had been reduced to 18% fat. The granules had a very good, crunchy texture, and a pleasant, peanut flavor and aftertaste. The micella drained after each of cycles 1–3 was delivered to a micella storage tank for further use. The fat reduction in this example was 78% by volume, 65% by weight.

EXAMPLE 5

Roasted Almonds

Un-blanched commercially roasted diced almonds of average dimension approximately 3/16" were subjected to the same protocol as in example 4 above, except that 24 period of the third cycle was divided into two 12-hour cycles (i.e. to give a total of 4 cycles of 4, 8, 12, and 12 hours respectively). The original 55% fat content had been reduced in the finished product to 19% while the flavor remained pleasant and the color of the meat lightened to cream color, whilst the color of the skin remained dark brown. The fat reduction in this example was 81% by volume, 65% by weight.

EXAMPLE 6

Post-Roasting of Extracted Roasted Almonds

Partially defatted almonds prepared as described in Example 5 were re-roasted in oil almond at 325 F. for 5 minutes. The almonds developed a much more crunchy texture and a stronger nutty flavor than before, and a deeper golden almond surface color. Re-roasting increased the fat content by about 12%. The product retained its crunchiness when immersed in water for a longer period of time than the original partially defatted almond pieces from which it was derived. The overall fat reduction in this case was about 63% by volume, 43% by weight.

EXAMPLE 6

Raw Cashews

Commercial raw cashews containing 55% fat were subjected to the following room temperature extraction protocol with a mixture of 10% propane and 90% butane: Load & seal; Evacuate & vapor fill; Cycle 1–24 hr; Cycle 2,-24 hr; Desolventize at 135 F.; Evacuate & hold 5 min; Isolate 4 hr; Evacuate & hold 5 min; Isolate 4 hr; Evacuate & hold 5 min; Isolate 4 hr; Evacuate & hold 5 min; Isolate 4 hr; Evacuate & hold 5 min; Isolate 4 hr; Evacuate & hold 5 min; Isolate 4 hr; Evacuate & hold 5 min; Isolate 8 hr; Evacuate; Flush with Nitrogen/Unload. The finished product contained 28% fat and had a pleasant, distinctly sweet cashew flavor and aftertaste, and a crunchy texture. The product had slight grey discolorations in random spots. The fat reduction for this example was 68% by volume, 49% by weight.

Having thus described the invention, that which is claimed is:

1. A method of desolventizing a marc resulting from an extraction of a mass of an oil-containing material with a normally gaseous hydrocarbon solvent for the oil in said material, said extraction being carried out in a closed vessel which is at least partially filled with said mass of material, said closed vessel being maintained during the extraction under a pressure at which said hydrocarbon solvent is liquefied, and after completion of the extraction, the solvent is drained from the marc while the marc remains within said closed vessel, leaving residual solvent retained in the marc, and gaseous vapors heated to a temperature above the boiling point of said hydrocarbon solvent are contacted with said marc within said vessel to desolventize the marc by volatilization of the residual solvent therein and carry the volatilized solvent from said closed vessel, the improvement of desolventizing the marc by the steps of passing the heated gaseous vapors through a first region of said vessel and the volume of said marc therein for a selected period of time sufficient to volatilize into the gaseous vapors residual solvent from the marc in said region to the desired extent; next, passing heated vapors through another region of said vessel and the volume of said marc therein for a period of time to volatilize into said heated vapors residual solvent from the marc in said other region to the desired extent; then passing heated vapors through still other regions of said vessel and the volumes of marc therein in turn as necessary to contact the entirety of said marc mass with heated vapors, the passage of vapors through each of said still other regions being of a duration sufficient to remove to the desired extent residual solvent from the marc therein; and when residual solvent has been removed to the desired extent from said marc as a whole, discharging the desolventized marc from said vessel.

2. The method of claim 1 wherein said vessel in which said marc mass is confined is elongated along one axis between opposite ends, said first region of the vessel is located generally adjacent one of said ends, said second region is located generally adjacent said first region in the direction of the other of said ends, and said other regions are located in sequence between said second region and the other end with the last thereof generally adjacent said other end.

3. The method of claim 2 wherein said closed vessel is provided with a plurality of inlet ports adapted to be selectively opened to introduce said heated vapors into said regions of said vessel and closed and a plurality of outlet ports adapted to be selectively opened to remove said heated vapors from said regions and closed, said inlet and outlet ports being respectively disposed in axially spaced relation along said vessel with one of said inlet ports being adjacent said one end of said vessel and the other inlet ports spaced axially therefrom toward the other end of said vessel and one of said outlet ports being adjacent said other end of said vessel and the other outlet ports spaced axially therefrom toward said one end, and said ports are selectively opened in axially spaced apart pairs of one inlet port and one outlet port next adjacent in axially spaced relation to said one inlet port to pass said vapors through the region of said vessel disposed between the open pair of said ports, the inlet and outlet ports other than said one pair remaining closed.

4. The method of claim 3 wherein the selective opening and closing of said inlet and outlet ports in pairs begins with a first pair including the inlet port located generally adjacent said one end of said vessel and the outlet port which is in axially spaced next adjacent relation thereto, and proceeds to subsequent pairs each including the inlet port in next adjacent axially spaced relation to the previously opened and closed inlet port and the outlet port in next adjacent axially spaced relation to the previously opened and closed outlet port.

5. A method for desolventizing a mass of marc containing residual solvent after the extraction of a component from a starting material with a heated normally gaseous solvent for said component which solvent is under liquefaction pressure during extraction, said mass remaining in entirety during desolventization within a closed vessel, which comprises passing heated gas through said vessel and the marc mass therein to volatilize into said heated gas residual solvent from said marc mass in a plurality of stages, heated gas being passed through a single stage at a time and continued for that stage for a period sufficient to volatilize the desired amount of residual solvent from the marc in said stage, the number of said plurality of stages being sufficient to contact said heated vapors with all of said marc mass, and then discharging the desolventized marc from said vessel.

6. The method of claim 5 wherein said closed vessel has opposite ends and said gas is passed through said plurality of stages of said vessel in sequence beginning with a first stage adjacent one end of the mass and ending with a final stage adjacent the opposite end of the mass.

7. The method of claim 6 wherein said plurality of stages includes at least one additional stage disposed generally intermediate said first and final stages.

8. The method of claim 5 wherein said heated gas comprises heated vapors derived from the extraction solvent.

9. The method of claim 1 wherein the marc mass is depressurized below extraction pressure prior to desolventization.

10. The method of claim 1 wherein said gaseous vapors are vapors of said hydrocarbon solvent.

11. The method of claim 1 wherein said gaseous vapors of said hydrocarbon solvent are derived from hydrocarbon solvent drained from said vessel after completion of the extraction to thereby recycle said solvent.

* * * * *